United States Patent
Mickelson (10) Patent No.: US 6,630,091 B2
(45) Date of Patent: Oct. 7, 2003

(54) METHOD OF MANUFACTURING A SCREEN DEVICE

(76) Inventor: Doug Mickelson, 7009 Sunnyside St., Fargo, ND (US) 58104-5309

(*) Notice: Subject to any disclaimer, the term of this patent is extended or adjusted under 35 U.S.C. 154(b) by 352 days.

(21) Appl. No.: 09/862,409

(22) Filed: May 21, 2001

(65) Prior Publication Data

US 2002/0171174 A1 Nov. 21, 2002

(51) Int. Cl.[7] .................. B29C 41/04; B29C 41/20; B29C 70/76
(52) U.S. Cl. .................. 264/273; 264/310; 264/279; 425/425
(58) Field of Search .................. 264/273, 274, 264/275, 279, 279.1, 310, 311, 312, 271.1, 259, 252; 425/425, 116, 125; B29C 70/76, 41/04, 41/20

(56) References Cited

U.S. PATENT DOCUMENTS

| | | | | |
|---|---|---|---|---|
| 2,185,568 A | * | 1/1940 | Ratner | 264/46.9 |
| 3,107,991 A | * | 10/1963 | Taussig | 55/511 |
| 3,585,134 A | * | 6/1971 | Schmidt et al. | 210/495 |
| 3,713,937 A | * | 1/1973 | Eichner | 156/245 |
| 3,909,168 A | | 9/1975 | Greenswell | |
| 3,937,780 A | * | 2/1976 | Mercier | 264/274 |
| 4,049,767 A | * | 9/1977 | Vaidya | 264/257 |
| 4,343,754 A | | 8/1982 | Wilde et al. | |
| 4,379,104 A | * | 4/1983 | Koorevaar | 264/45.5 |
| 4,680,149 A | | 7/1987 | Rawlings et al. | |
| 4,861,462 A | * | 8/1989 | Lehmann et al. | 209/269 |
| 5,417,906 A | * | 5/1995 | Chiodo | 264/153 |
| 5,529,476 A | * | 6/1996 | Borasio et al. | 425/116 |
| 6,143,168 A | | 11/2000 | Shackelford | |
| 2002/0171174 A1 | * | 11/2002 | Mickelson | 264/273 |

FOREIGN PATENT DOCUMENTS

AU 9950165 A * 4/2000 ........... G09F/13/04

* cited by examiner

Primary Examiner—Mark Eashoo
Assistant Examiner—Geoffrey P. Shipsides
(74) Attorney, Agent, or Firm—Michael S. Neustel

(57) ABSTRACT

A method of manufacturing a screen device for permanent placement of a screen within a plastic structure. The method of manufacturing a screen device includes providing a mold comprised of an upper mold and a lower mold defining a mold cavity, positioning plastic within the mold cavity, positioning a screen upon a lower mold, securing the upper mold to the lower mold with the screen positioned within, performing rotational molding upon the mold, and removing the finished product from the mold. The finished product is comprised of a perimeter structure having an opening within with the screen completely enclosing the opening. The outer perimeter of the screen is molded directly into the inner wall of the finished product to prevent objects from passing about the outside portion of the screen.

18 Claims, 11 Drawing Sheets

FIG 9

METHOD OF MANUFACTURING A SCREEN DEVICE

BACKGROUND OF THE INVENTION

1. Field of the Invention

The present invention relates generally to plastic molding processes and more specifically it relates to a method of manufacturing a screen device for permanent placement of a screen within a plastic structure.

2. Description of the Prior Art

Plastic molding techniques have been in use for years. The four most common methods of plastic molding are comprised of injection molding, blow molding, vacuum molding, and rotational molding.

Rotational molding offers many advantages over blow molding and injection molding. Rotational molding is well suited to producing parts that are seamless, fully or partially enclosed, and hollow with high side-wall strength and dimensional integrity. Rotational molding is superior to other molding techniques in the areas of cost reduction, economical runs and part size. Parts that are rotationally molded often provide an excellent, lightweight alternative to products usually formed of metal or fiberglass.

In rotational molding, liquid or powdered thermoplastic resin is formed inside a closed mold or cavity while the mold is rotating biaxially in a heating chamber. To obtain mold rotation in two planes perpendicular to each other (providing even distribution of the resin), the spindle is turned on a primary axis, while molds are rotated on a secondary axis.

Rotational molding (also popularly known as "rotomolding") is best suited for large, hollow products requiring stress-free strength, complicated curves, a good finish, a variety of colors, comparatively short runs (flexible schedule), very long production runs (less costly), and uniform wall thickness. The process has been used for products such as water tanks, storage tanks, industrial containers, outdoor chairs and benches, road barriers, portable outhouses, modular bathrooms, garbage cans, telephone booths, boat hulls, light globes, ice buckets, appliance housings (carpet and vacuum cleaners), and toys. The technique is applicable to most thermoplastic but is most widely used with polyethylene.

There are essentially six basic steps in rotational molding; mounting the tool, loading resin, molding and curing, cooling, unloading the part, and final finish. First, tools are mounted on large spindles that will rotate during the heating process. Second, liquid or powdered plastic is loaded into a hollow mold. Third, the mold halves are then clamped shut and moved into an oven where the loaded mold spins biaxially. In the oven, heat penetrates the mold causing the plastic, if it is powdered form, to become tacky and stick to the mold surface, or if it is liquid form, to start to gel. Heating is done in a gas-fired hot-air oven or similar oven. Because the molds continue to rotate while being heated, the plastics gradually become distributed evenly on the mold cavity walls through gravitational force. As the cycle continues, the polymer melts completely, forming a homogeneous layer of molten plastic. When the parts have been formed, the molds move to a cooling chamber where cooling is accomplished by a cold water spray and/or forced cold air and/or liquid circulating inside the mold. The mold continues to rotate during the cooling cycle so as to ensure that the part does not sag away from the mold surface, causing distortion. The mold is then opened and the parts are removed. This can be done manually or by using forced air or mechanical means to eject the part. Finally, parts can be trimmed, drilled, or cutout to the user's requirements. Certain tanks require fittings for fill, drain and sensor probes. After fittings are installed, all tanks are pressure/water tested to insure adequate seal.

Examples of patented devices which may be illustrative of such prior art include U.S. Pat. No. 6,143,168 to Shackeford; U.S. Pat. No. 3,909,168 to Greenswell; U.S. Pat. No. 4,343,754 to Wilde et al.; and U.S. Pat. No. 4,680,149 to Rawlings et al.

While these devices may be suitable for the particular purpose to which they address, they are not as suitable for permanent placement of a screen within a plastic structure. Conventional methods of securing a screen within a plastic structure do not provide an adequate long-term securing means.

In these respects, the method of manufacturing a screen device according to the present invention substantially departs from the conventional concepts and designs of the prior art, and in so doing provides an apparatus primarily developed for the purpose of permanent placement of a screen within a plastic structure.

SUMMARY OF THE INVENTION

In view of the foregoing disadvantages inherent in the known types of methods of manufacturing and structures now present in the prior art, the present invention provides a new method of manufacturing a screen device construction wherein the same can be utilized for permanent placement of a screen within a plastic structure.

The general purpose of the present invention, which will be described subsequently in greater detail, is to provide a new method of manufacturing a screen device that has many of the advantages of the methods of manufacturing mentioned heretofore and many novel features that result in a new method of manufacturing a screen device which is not anticipated, rendered obvious, suggested, or even implied by any of the prior art methods of manufacturing, either alone or in any combination thereof.

To attain this, the present invention generally comprises a screen device includes providing a mold comprised of an upper mold and a lower mold defining a mold cavity, positioning plastic within the mold cavity, positioning a screen upon a lower mold, securing the upper mold to the lower mold with the screen positioned within, performing rotational molding upon the mold, and removing the finished product from the mold. The finished product is comprised of a perimeter structure having an opening within with the screen completely enclosing the opening. The outer perimeter of the screen is molded directly into the inner wall of the finished product to prevent objects from passing about the outside portion of the screen.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method of manufacturing a screen device that will overcome the shortcomings of the prior art devices.

A second object is to provide a method of manufacturing a screen device for permanent placement of a screen within a plastic structure.

Another object is to provide a method of manufacturing a screen device utilizing plastic rotational molding.

Another object is to provide a method of manufacturing a screen device that provides an economical means of manufacturing a screen pan structure.

An additional object is to provide a method of manufacturing a screen device that is easy to utilize.

A further object is to provide a method of manufacturing a screen device that provides a complete seal around the exterior portion of the screen.

Another object is to provide a method of manufacturing a screen device that can be utilized upon various sizes of plastic structure.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 11 illustrate a method of manufacturing a screen device 10, which comprises a screen 50 device includes providing a mold comprised of an upper mold 20 and a lower mold 30 defining a mold cavity 60, positioning plastic 40 within the mold cavity 60, positioning a screen 50 upon a lower mold 30, securing the upper mold 20 to the lower mold 30 with the screen 50 positioned within, performing rotational molding upon the mold, and removing the finished product from the mold. The finished product is comprised of a perimeter structure having an opening within with the screen 50 completely enclosing the opening. The outer perimeter of the screen 50 is molded directly into the inner wall 48 of the finished product to prevent objects from passing about the outside portion of the screen 50.

The process of rotational molding has been described previously and is hereby incorporated by reference. It can be appreciated that there may be various other methods of rotational molding utilized within the present invention that will accomplish a similar means in operating the present invention.

As shown in FIGS. 1 through 4 of the drawings, the mold is divided into halves comprised of an upper mold 20 and a lower mold 30. The terms "upper" and "lower" are merely utilized within this application for the purpose of describing the relationship between the halves, and should not be interpreted as meaning their inherent terms.

The upper mold 20 is generally comprised of a perimeter structure that may have any shape such as but not limited to circular, rectangular, square, oblong and triangular. The upper mold 20 preferably has an upper outer portion 24 with a plurality of upper brackets 22 attached thereto. The upper brackets 22 correspond to a plurality of lower brackets 32 that extend from the lower mold 30 wherein a corresponding plurality of fasteners 12 extend through the brackets 22, 32 to secure the upper mold 20 upon the lower mold 30 thereby defining the mold cavity 60 as is well known in the art of rotational molding. The upper outer portion 24 may have any shape as can be appreciated by one skilled in the art.

The upper mold 20 further includes an upper floor 26 that is connected to the upper outer portion 24. The upper floor 26 is preferably lower than the upper outer portion 24 for creating an opening within the finished product as is further well known in the rotational molding industry. The upper floor 26 has an upper inner surface 28 and an upper outer surface opposite of one another. The upper inner surface 28 faces the lower inner surface 38 of the lower mold 30 as best shown in FIGS. 8 through 11 of the drawings.

As further shown in FIGS. 8 through 11 of the drawings, the upper mold 20 includes an extended portion 27 that extends about the outer portion of the upper floor 26 extending from the upper inner surface 28. The extended portion 27 extends a finite distance for applying direct pressure to the lower inner surface 38 of the lower mold 30 during the rotational molding process thereby preventing liquid plastic 40 from escaping from the mold cavity 60 about the screen 50 which is positioned between the lower mold 30 and the upper mold 20. The extended portion 27 may have any shape as can be appreciated.

The lower mold 30 is generally comprised of a perimeter structure that may have any shape such as but not limited to circular, rectangular, square, oblong and triangular. The lower mold 30 may or may not mirror the shape of the upper mold 20 as are commonly utilized within the rotational molding industry.

The lower mold 30 preferably has a lower outer portion 34 with a plurality of lower brackets 32 attached thereto. The lower brackets 32 correspond to a plurality of upper brackets 22 that extend from the upper mold 20 wherein a corresponding plurality of fasteners 12 extend through the brackets 22, 32 to secure the upper mold 20 upon the lower mold 30 thereby defining the mold cavity 60 as is well known in the art of rotational molding. The lower outer portion 34 may have any shape as can be appreciated by one skilled in the art.

The lower mold 30 further includes a lower floor 36 that is connected to the lower outer portion 34. The lower floor 36 is preferably raised within the lower outer portion 34 for creating an opening within the finished product as is further well known in the rotational molding industry. The lower floor 36 has a lower inner surface 38 and an outer surface opposite of one another. The lower inner surface 38 faces the upper inner surface 28 of the upper mold 20 as best shown in FIGS. 8 through 11 of the drawings.

Figure 10:
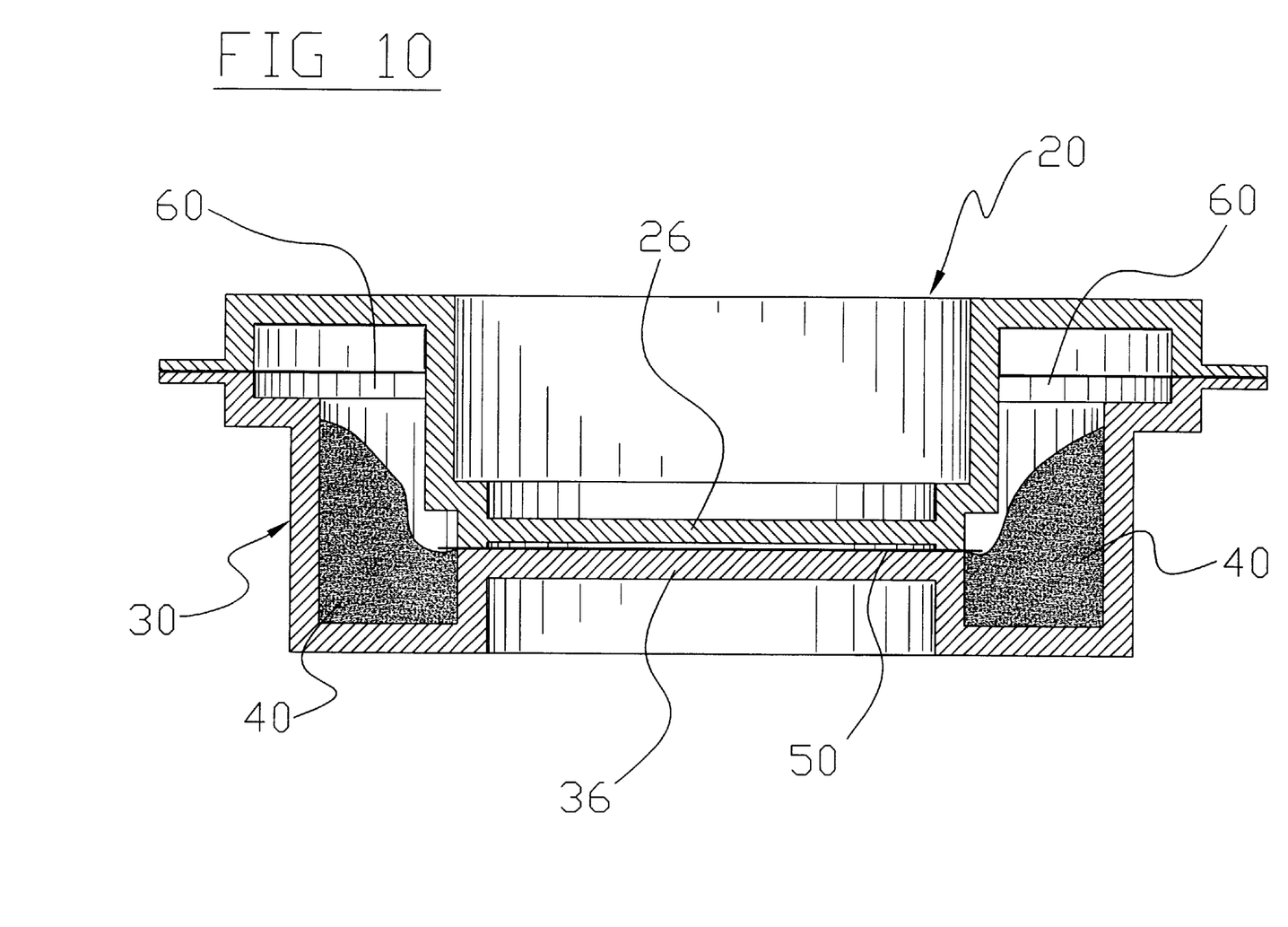
FIG. 10 is a side cutaway view of the upper mold secured to the lower mold with the screen positioned within along with plastic contained within the mold cavity.

As shown in FIGS. 3 through 6 of the drawings, the screen 50 may be comprised of any well-known structure. The screen 50 may have various designs and sizes of openings. The outer perimeter of the screen 50 may have various shapes as can be appreciated. The screen 50 is formed of a sufficient shape to completely enclose the opening created within the finished product. The screen 50 preferably is broad enough to extend into the mold cavity 60 a finite distance as shown in FIG. 10 of the drawings. The screen 50 is preferably constructed of a metal material, however nonmetal material may be utilized that is able to withstand the high temperatures incurred during rotational molding.

Figure 1:
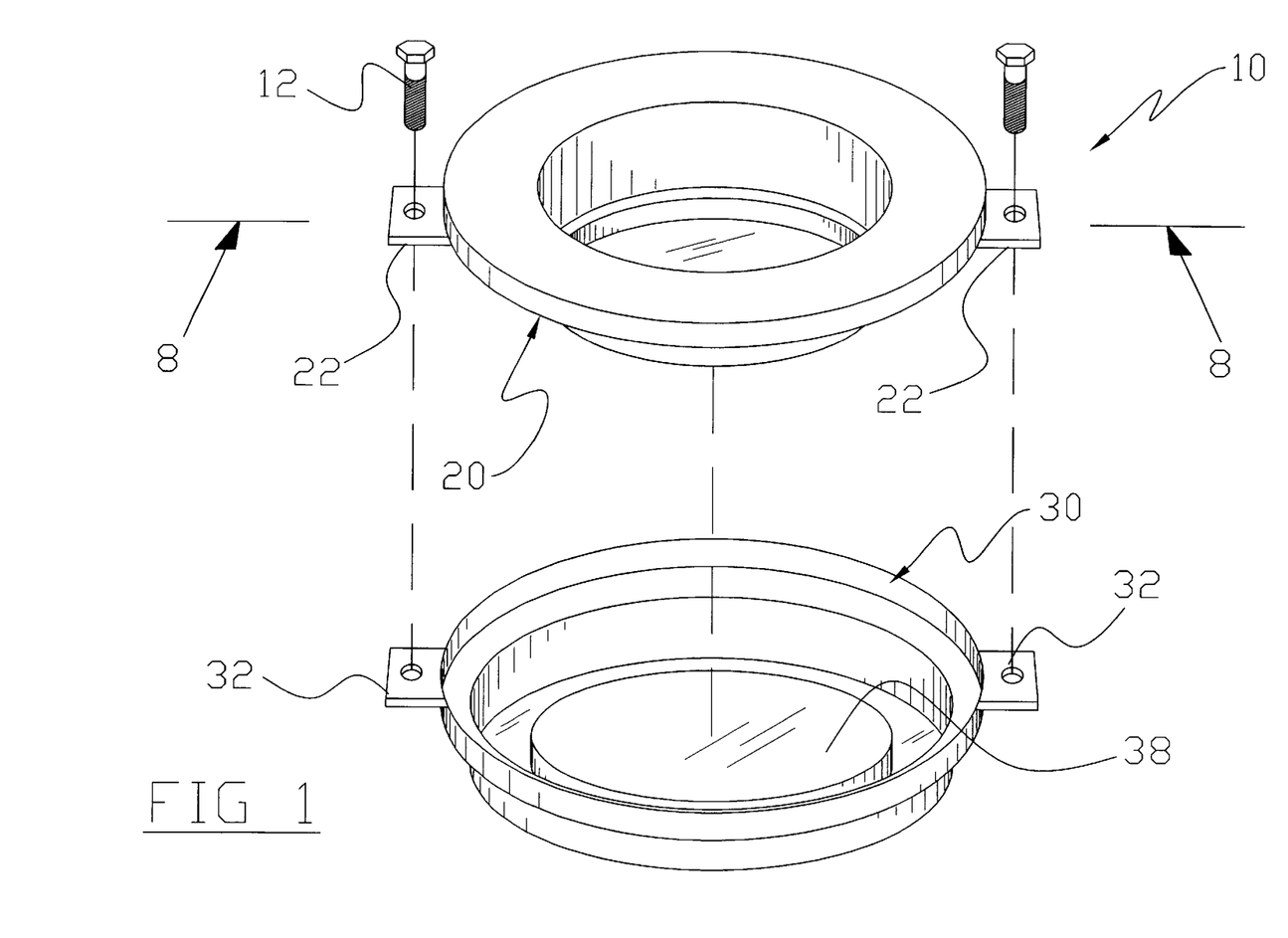
FIG. 1 is an exploded upper perspective view of the mold (lower mold and upper mold).
Figure 2:
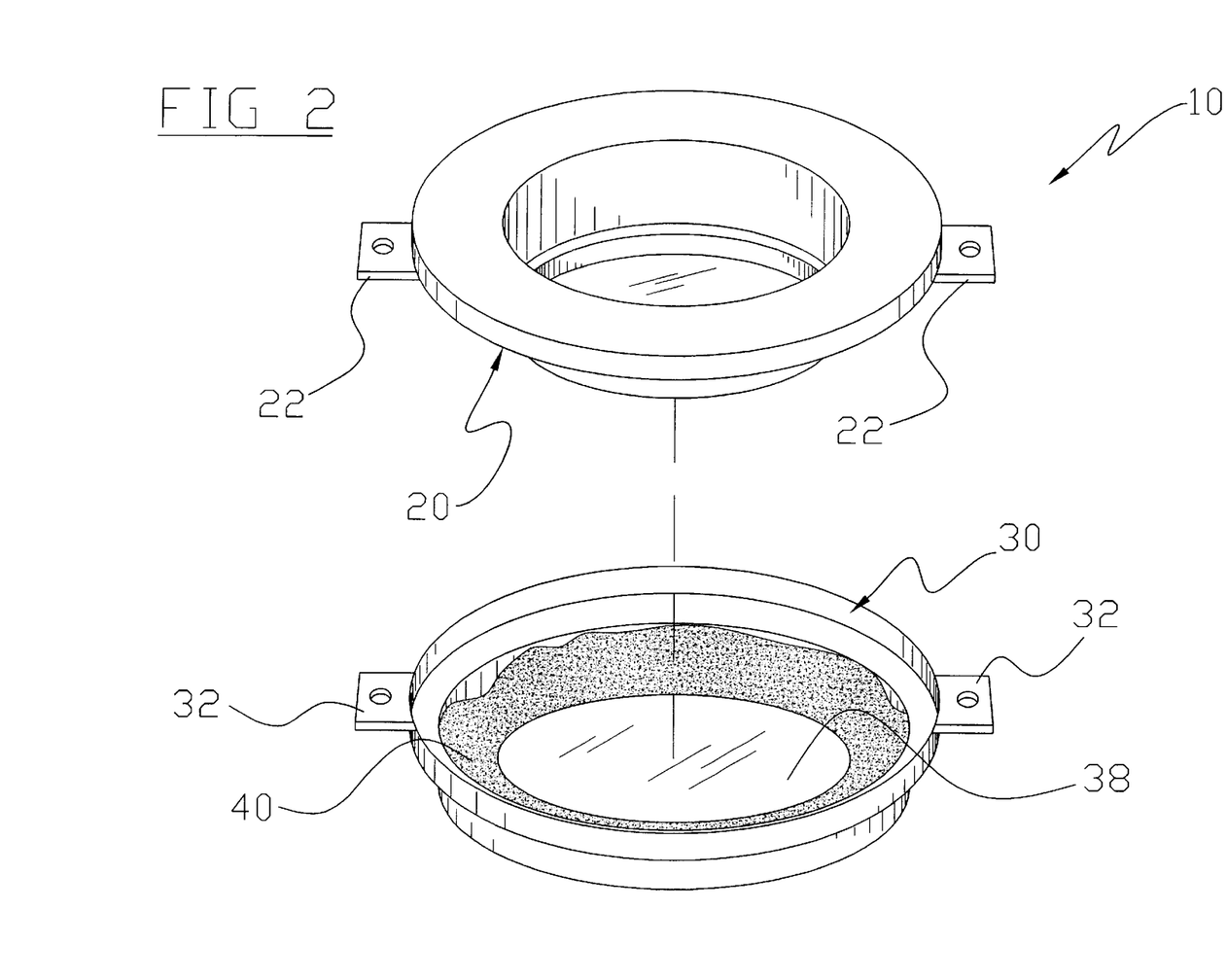
FIG. 2 is an exploded upper perspective view of the mold with granular or liquid plastic positioned within.
Figure 3:
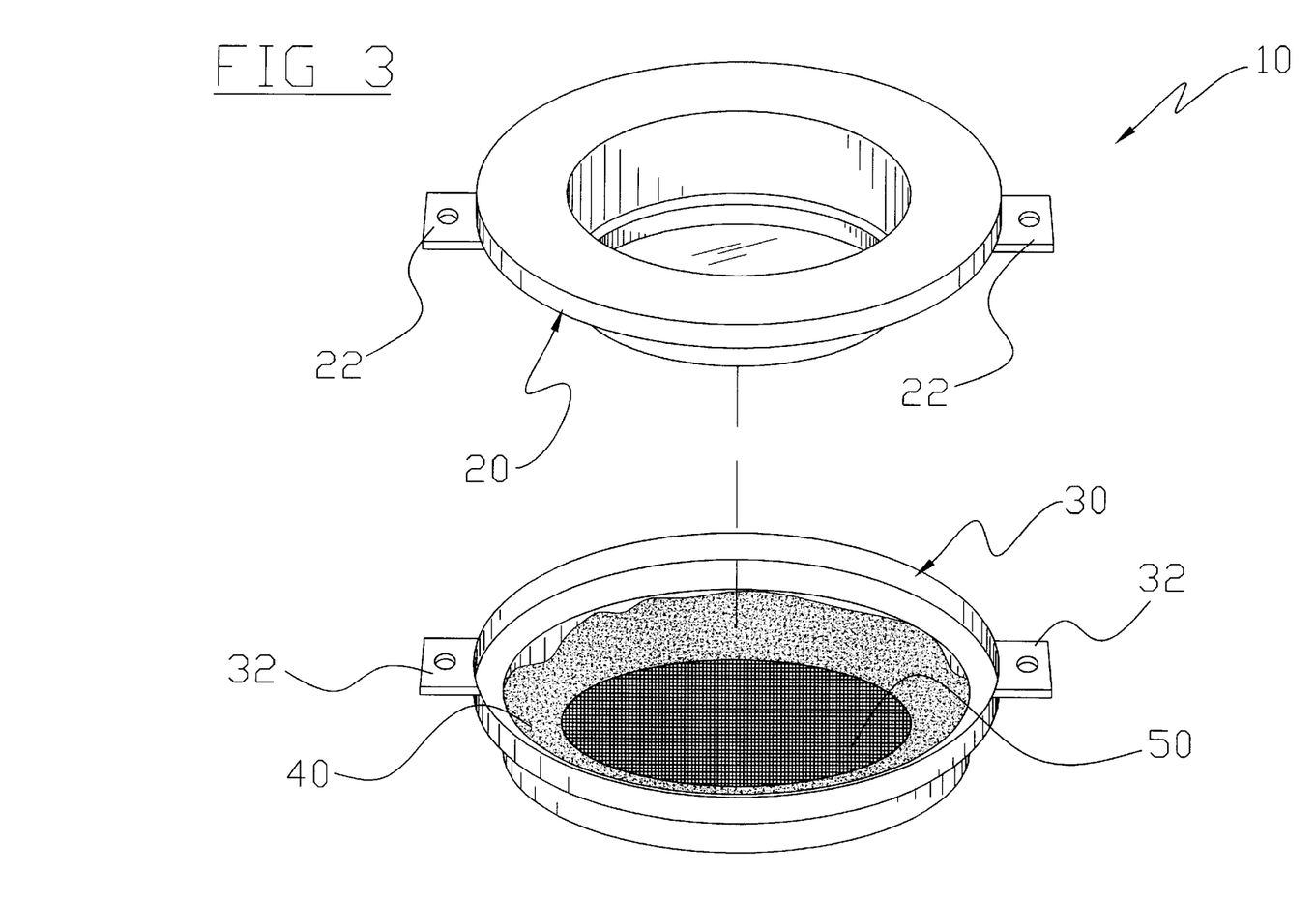
FIG. 3 is an exploded upper perspective view of the mold with granular or liquid plastic positioned within along with the screen positioned upon the lower mold.
Figure 4:
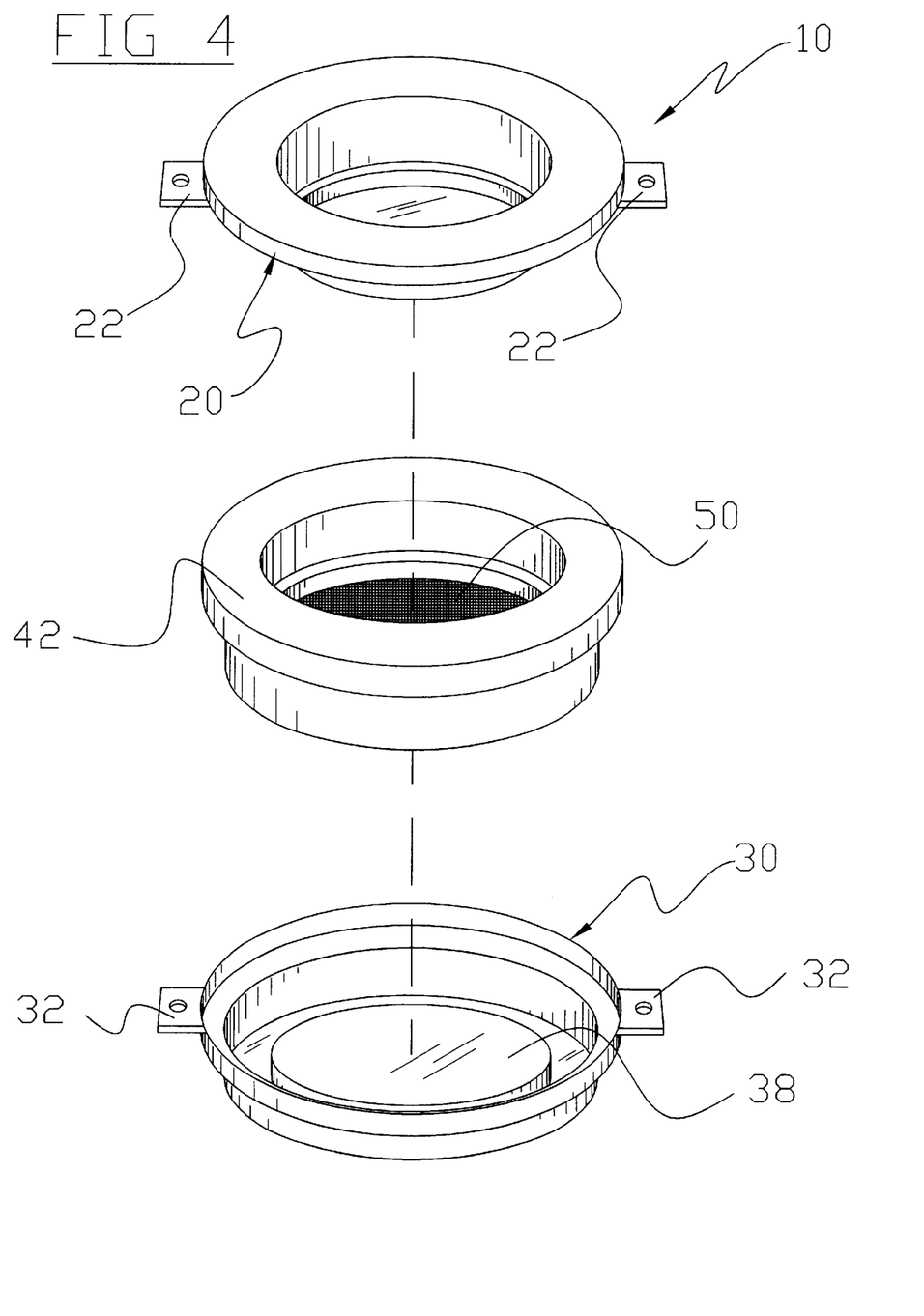
FIG. 4 is an exploded view of the final product created with the upper mold and the lower mold removed from thereof.
Figure 5:
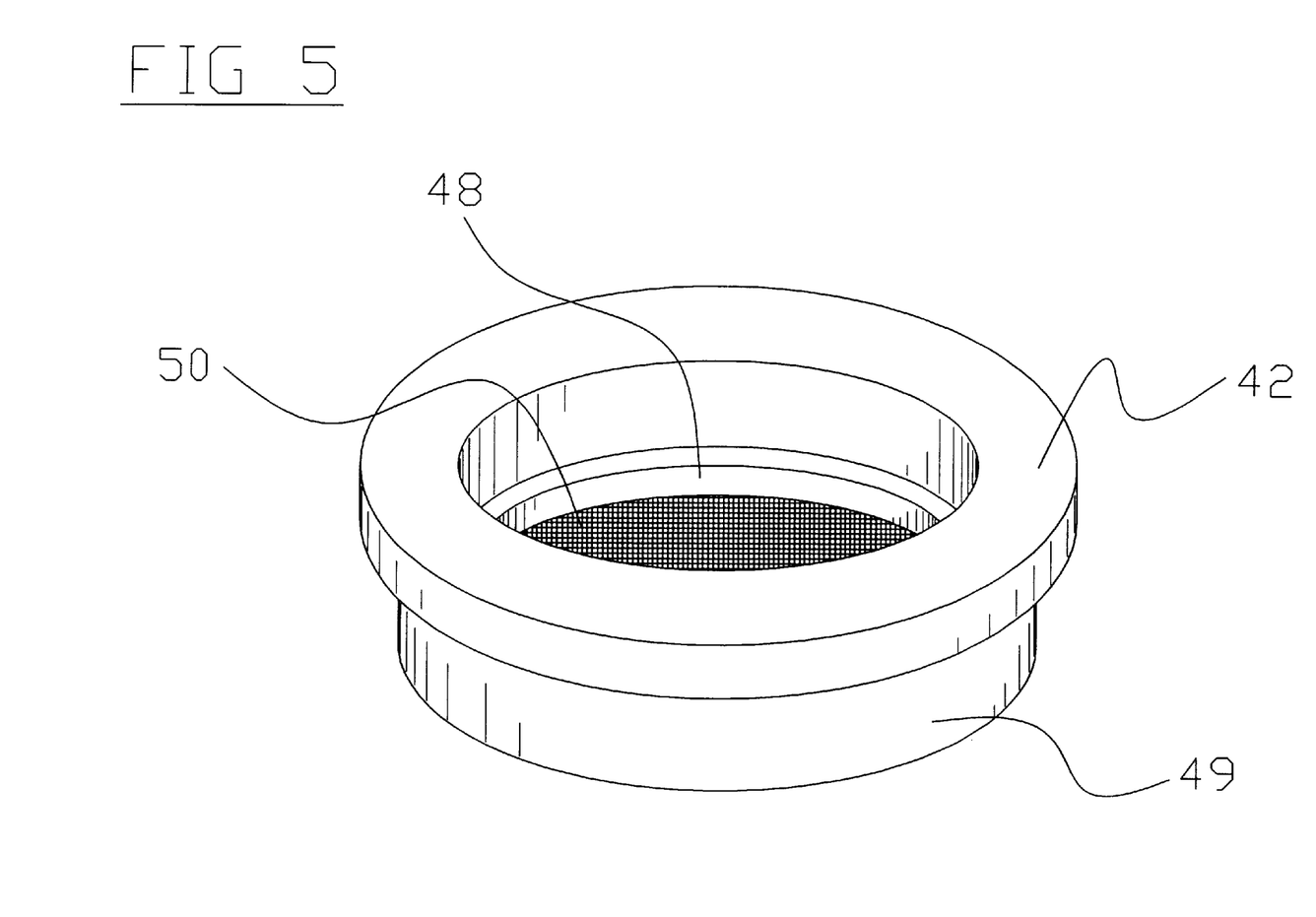
FIG. 5 is an upper perspective view of the final product.
Figure 6:
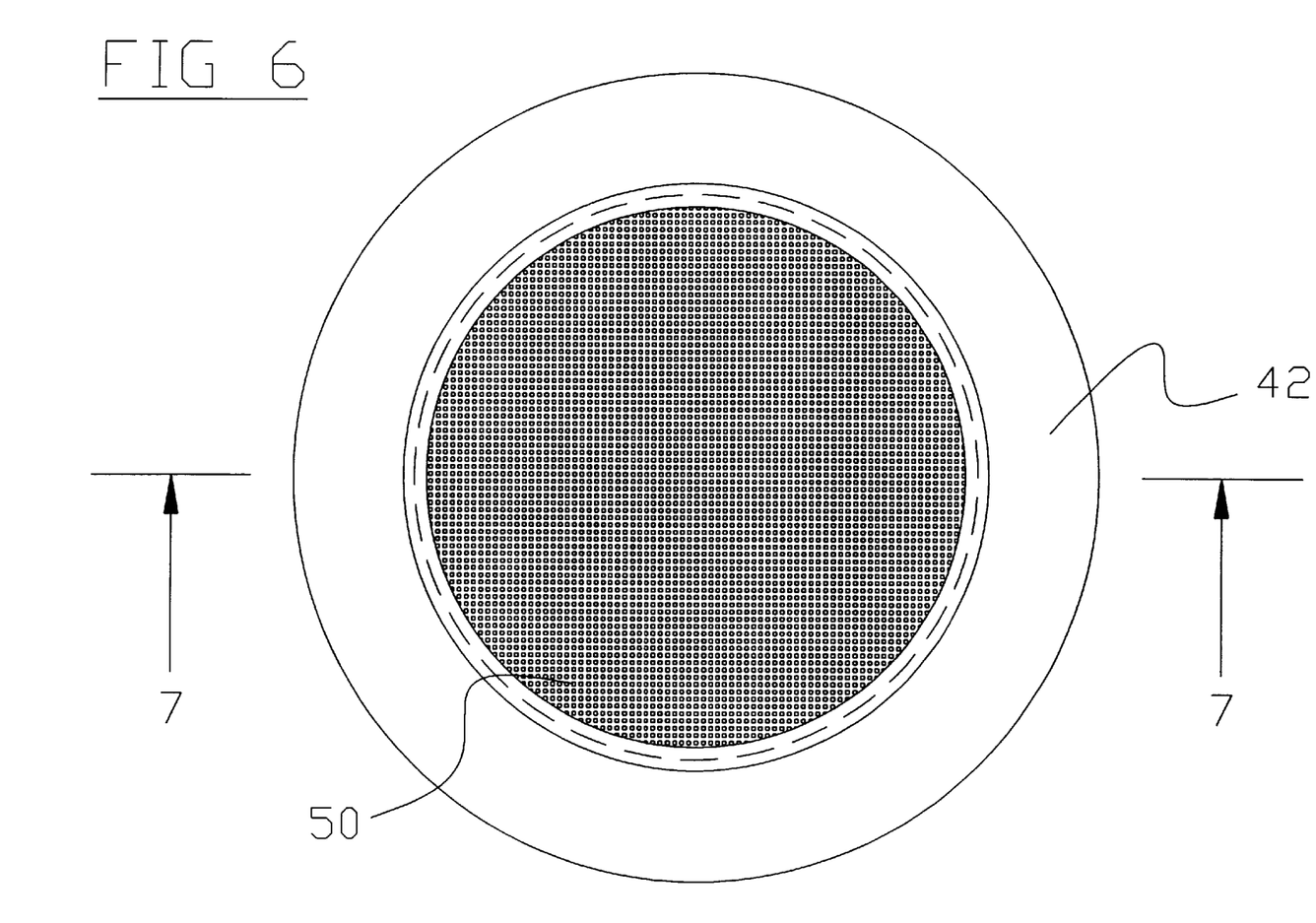
FIG. 6 is a top view of the final product.
Figure 7:
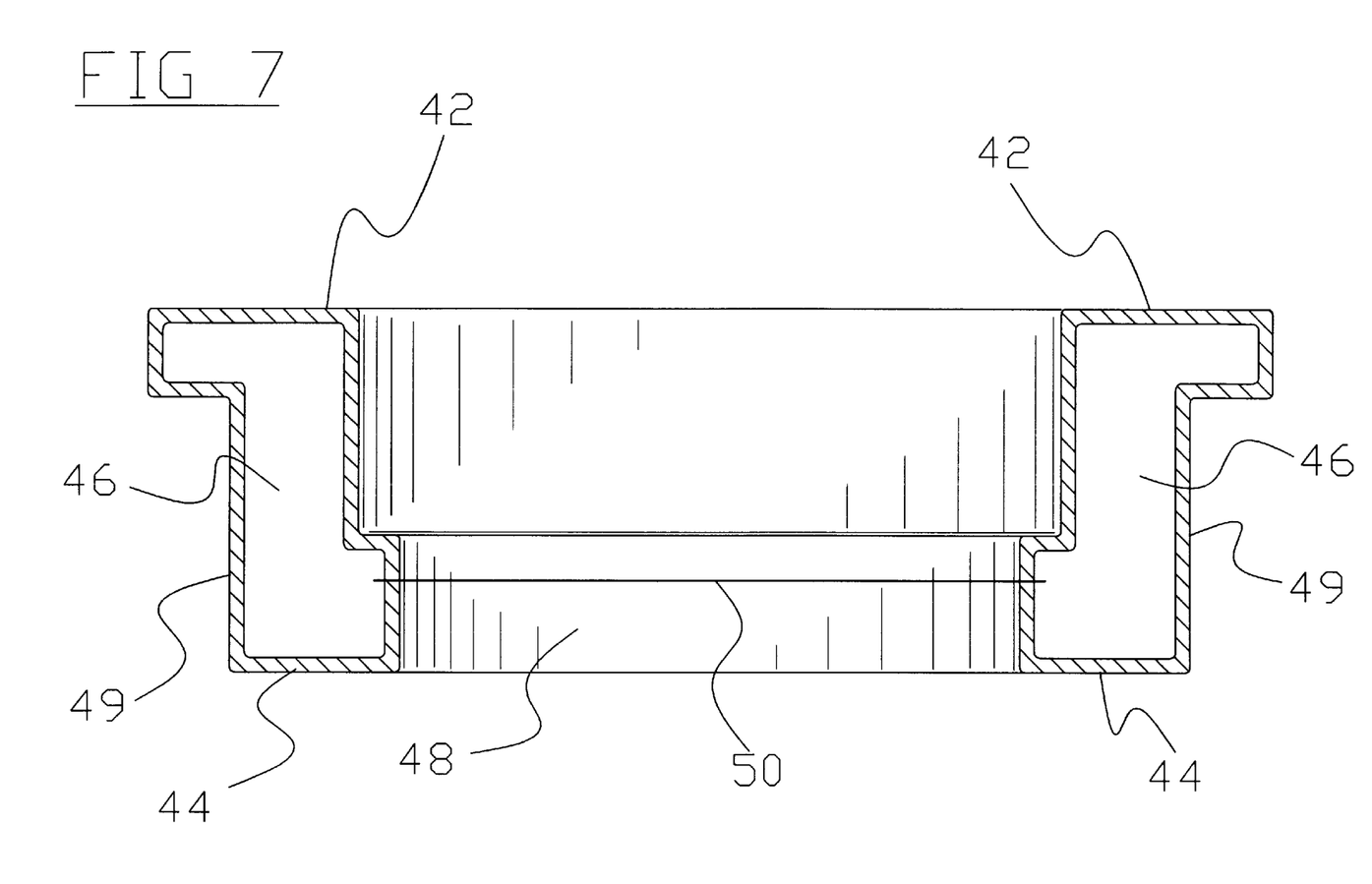
FIG. 7 is a cross sectional view taken along line 7—7 of FIG. 6.
Figure 8:
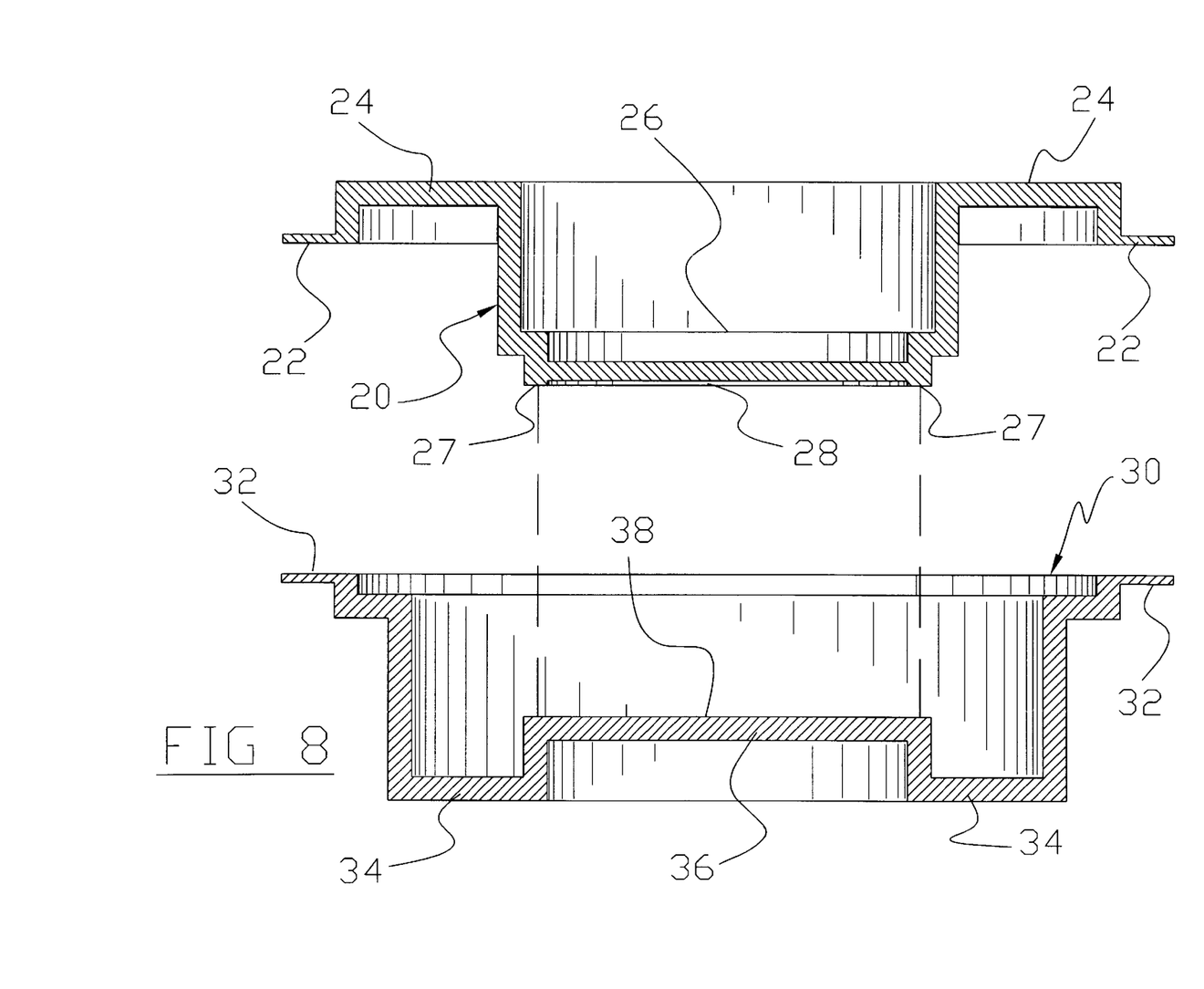
FIG. 8 is a cross sectional view taken along line 8—8 of FIG. 1.
Figure 9:
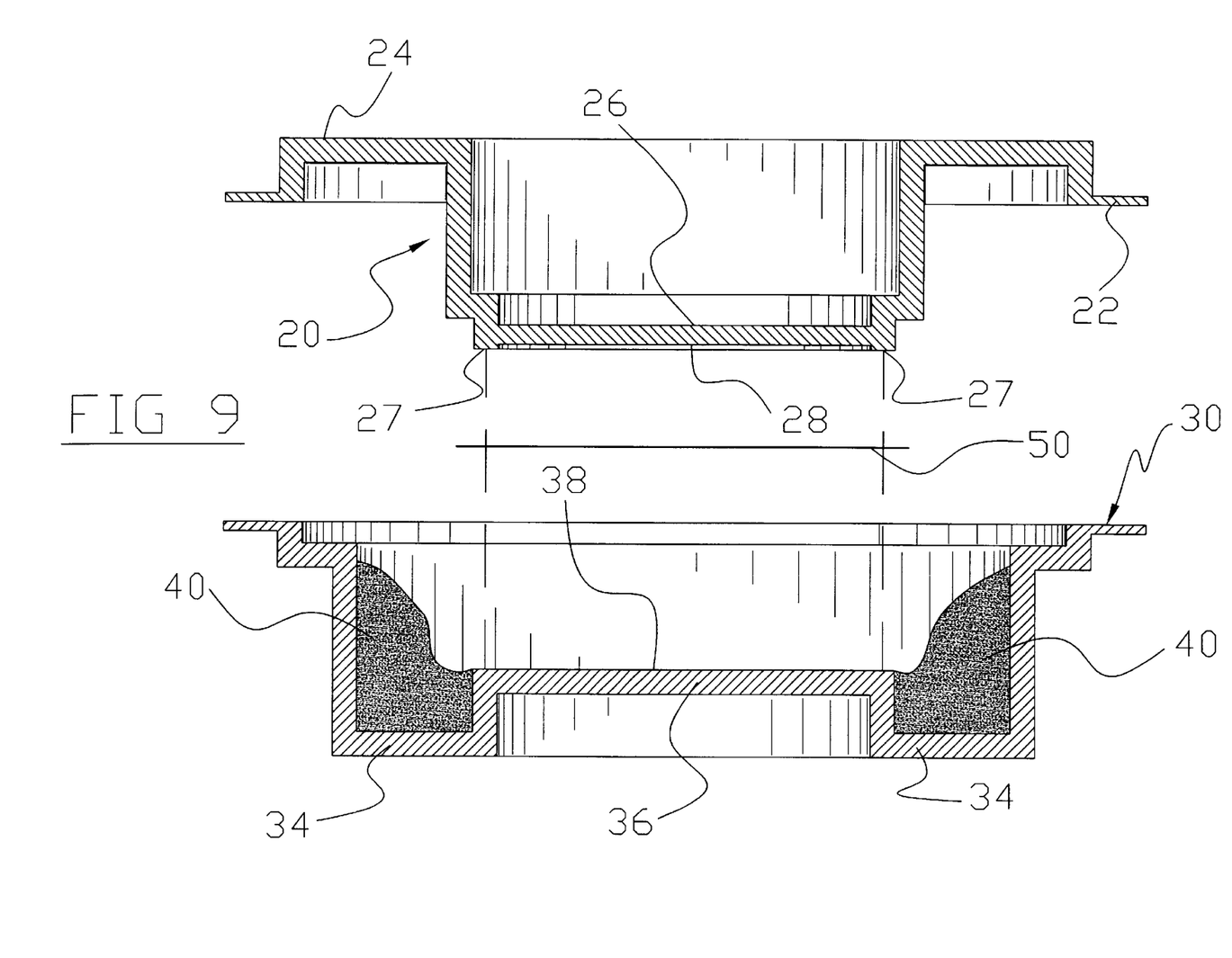
FIG. 9 is a side cutaway view of the upper mold, lower mold and the screen with respect to one another.
Figure 11:
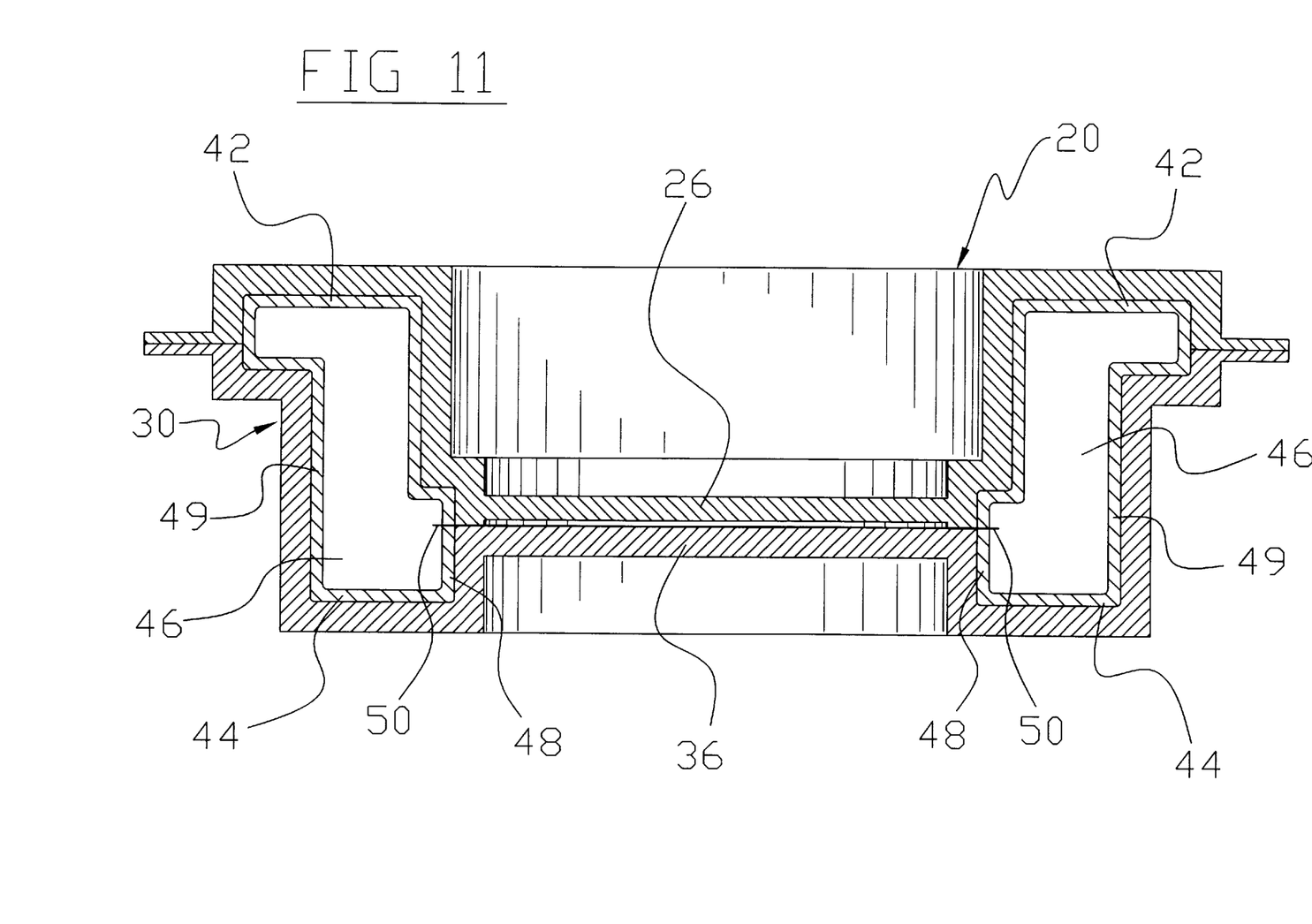
FIG. 11 is a side cutaway view of the final product containing the screen positioned within the mold after utilizing rotational molding.

In use, the user first fills the lower mold 30 with plastic 40 as shown in FIG. 2 of the drawings. The user then positions the screen 50 upon the lower inner surface 38 of the lower floor 36 of the lower mold 30. The user positions the screen 50 so that the outer perimeter overlaps the lower floor 36 as shown in FIGS. 10 and 11 of the drawings. The user then positions the upper mold 20 upon the lower mold 30 so that the extended portion 27 engages the outer portion of the screen 50. When the user secures the fasteners 12 within the brackets 22, 32, the upper mold 20 is drawn toward the lower mold 30 thereby placing increased pressure from the extended portion 27 upon the screen 50 and the opposing lower inner surface 38 of the lower floor 36. Once the upper mold 20 is properly secured to the lower mold 30, the mold is subjected to the rotational molding process thereby melting the plastic 40 within the mold cavity 60. During the rotational molding process the liquid plastic 40 spreads about the interior surface of the mold that defines the finished product as shown in FIG. 11 of the drawings. The liquid plastic 40 further extends through the openings within the outer portion of the screen 50 extending into the mold cavity 60 as shown in FIG. 11 of the drawings. The user then allows the mold to cool thereby hardening the liquid plastic 40 within the mold. The hardened plastic 40 forms the finished product having an opening covered by the screen 50 as shown in FIGS. 5 through 7 of the drawings. As shown in FIG. 4 of the drawings, the upper mold 20 is removed from the lower mold 30 thereby allowing the finished product to be removed from within the mold. As shown in FIGS. 4 through 7 of the drawings, the finished product is typically comprised of an upper wall 42, a lower wall 44, an inner wall 48, an outer wall 49 and a structure cavity 46. The screen 50 preferably extends a finite distance into the structure cavity 46 as shown in FIG. 7 of the drawings. The finished product may thereafter be utilized to separate various types of materials and liquids.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of manufacturing a screen device utilizing a mold having an upper mold and a lower mold defining a mold cavity, wherein said upper mold has an upper floor and wherein said lower mold has a lower floor in opposition to one another, comprising:

(a) positioning plastic within said lower mold;
   (b) positioning a screen upon a lower inner surface of said lower floor, wherein an outer portion of said screen extends a finite distance into said mold cavity, wherein said outer portion completely surrounds said screen;
   (c) securing said upper mold about said lower mold;
   (d) performing rotational molding upon said mold;
   (e) allowing said mold to cool; and
   (f) removing a finished product from said mold having said screen embedded within an opening of said finished product.

2. The method of manufacturing a screen device of claim 1, wherein said outer portion has a width at least ¼ of an inch wide.

3. The method of manufacturing a screen device of claim 1, wherein said outer portion has a width at least ½ of an inch wide.

4. The method of manufacturing a screen device of claim 1, wherein said outer portion has a width at least ⅛ of an inch wide.

5. The method of manufacturing a screen device of claim 1, wherein said wherein said outer portion has a width at least 1/16 of an inch wide.

6. The method of manufacturing a screen device of claim 1, wherein said upper floor includes an extended portion extending toward said lower mold for sealing said mold cavity adjacent said outer portion of said screen.

7. The method of manufacturing a screen device of claim 6, wherein said extended portion extends from said upper floor at least ⅛ of an inch.

8. The method of manufacturing a screen device of claim 1, wherein said finished product is comprised of an upper wall, a lower wall, an inner wall receiving said screen, and an outer wall defining a structure cavity within.

9. The method of manufacturing a screen device of claim 8, wherein said outer portion of said screen extends a finite distance into said structure cavity.

10. A method of manufacturing a screen device utilizing a mold having an upper mold and a lower mold defining a mold cavity, wherein said mold has a circular shape, and wherein said upper mold has an upper floor and wherein said lower mold has a lower floor in opposition to one another wherein said lower floor and said upper floor have a circular shape, comprising:

(a) positioning plastic within said lower mold;

(b) positioning a screen having a circular shape concentrically upon a lower inner surface of said lower floor, wherein an outer portion of said screen extends a finite distance into said mold cavity, wherein said outer portion completely surrounds said screen;

(c) securing said upper mold about said lower mold;

(d) performing rotational molding upon said mold;

(e) allowing said mold to cool; and (f) removing a finished product from said mold having said screen embedded within a center opening of said finished product.

11. The method of manufacturing a screen device of claim 10, wherein said outer portion has a width at least ¼ of an inch wide.

12. The method of manufacturing a screen device of claim 10, wherein said outer portion has a width at least ½ of an inch wide.

13. The method of manufacturing a screen device of claim 10, wherein said outer portion has a width at least ⅛ of an inch wide.

14. The method of manufacturing a screen device of claim 10, wherein said wherein said outer portion has a width at least 1/16 of an inch wide.

15. The method of manufacturing a screen device of claim 10, wherein said upper floor includes an extended portion extending toward said lower mold for sealing said mold cavity adjacent said outer portion of said screen.

16. The method of manufacturing a screen device of claim 15, wherein said extended portion extends from said upper floor at least ⅛ of an inch.

17. The method of manufacturing a screen device of claim 10, wherein said finished product is comprised of an upper wall, a lower wall, an inner wall receiving said screen, and an outer wall defining a structure cavity within.

18. The method of manufacturing a screen device of claim 17, wherein said outer portion of said screen extends a finite distance into said structure cavity.

* * * * *